United States Patent
Krolewski et al.

(10) Patent No.: US 12,151,543 B2
(45) Date of Patent: Nov. 26, 2024

(54) RELEASE SYSTEM FOR REMOVABLE VEHICLE PANEL

(71) Applicant: GM Global Technology Operations LLC, Detroit, MI (US)

(72) Inventors: Christine M. Krolewski, Washington, MI (US); Igor Lanis, Walled Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 289 days.

(21) Appl. No.: 17/901,226

(22) Filed: Sep. 1, 2022

(65) Prior Publication Data

US 2024/0075793 A1  Mar. 7, 2024

(51) Int. Cl.
  *B60J 5/04*   (2006.01)
  *B60R 13/02*  (2006.01)
  *E05B 83/36*  (2014.01)

(52) U.S. Cl.
  CPC ......... *B60J 5/0469* (2013.01); *B60R 13/0243* (2013.01); *E05B 83/36* (2013.01)

(58) Field of Classification Search
  CPC ........ B60J 5/0468; B60J 5/0469; B60J 5/042; B60J 5/0423; B60J 5/0425; B60J 5/0426; B60J 5/0427; B60J 5/0431; B60J 5/0433; B60J 5/0434; B60J 5/0441; B60J 5/0443; B60J 5/0447
  USPC .............................. 296/146.1, 147, 148, 202
  See application file for complete search history.

(56) References Cited

U.S. PATENT DOCUMENTS

| | | | | |
|---|---|---|---|---|
| 6,343,832 B1* | 2/2002 | Queener | ............... | B60J 5/0476 |
| | | | | 296/153 |
| 11,390,147 B2* | 7/2022 | Krapfl | ................... | B60J 5/0476 |
| 2020/0180407 A1* | 6/2020 | Whipps | ................. | B60J 5/0487 |
| 2022/0111708 A1* | 4/2022 | Krapfl | ................... | B60J 5/0463 |

FOREIGN PATENT DOCUMENTS

DE  202019100364 U1 *  3/2019  ............ B60J 5/0412

OTHER PUBLICATIONS

DE202019100364 (Year: 2019).*

* cited by examiner

*Primary Examiner* — Dennis H Pedder
(74) *Attorney, Agent, or Firm* — CANTOR COLBURN LLP

(57) ABSTRACT

A hybrid vehicle door includes a structural door member including a first stile supporting a hinge, a second stile supporting a latch and a rail member extending between the first stile and the second stile. A latch actuator system is mounted to the rail member. The latch actuator system includes a latch actuator member operatively connected to the latch and a latch element connector operatively connected to the latch. A removable panel is connected to at least the first stile and the second stile. The removable panel covers the latch actuator system. A removable panel handle system is mounted to the removable panel. The removable panel handle system includes a removable panel latch actuator member mounted to the removable panel and a latch element operatively connected to the removable panel latch actuator member. The latch element is engaged with the latch element connector of the latch actuator system.

20 Claims, 4 Drawing Sheets

RELEASE SYSTEM FOR REMOVABLE VEHICLE PANEL

INTRODUCTION

The subject disclosure relates to the art of vehicles and, more particularly, to a release system for a removable vehicle panel.

Certain vehicles include removable panels that may create a more open passenger environment. Door panels, roof panels, side panels may all be removed to open up a passenger compartment. Door panels are removed as an entire unit. As such, the door panel and the latching mechanism may be removed and stored. The removal of the entire unit, such as a door, may make certain passengers feel uncomfortable. That is, a large void in the side of the vehicle may be unsettling to certain passengers. Accordingly, it is desirable to provide a vehicle panel that may be configured to provide for an open passenger environment while, at the same time, increasing a passenger comfort level.

SUMMARY

A hybrid vehicle door, in accordance with a non-limiting example, includes a structural door member including a first stile supporting a hinge, a second stile supporting a latch and a rail member extending between the first stile and the second stile. A latch actuator system is mounted to the rail member. The latch actuator system includes a latch actuator member operatively connected to the latch and a latch element connector operatively connected to the latch. A removable panel is connected to at least the first stile and the second stile. The removable panel has an exterior surface and an interior surface covering the latch actuator system. A removable panel handle system is mounted to the removable panel. The removable panel handle system includes a removable panel latch actuator member mounted at the exterior surface and a latch element operatively connected to the removable panel latch actuator member. The latch element is engaged with the latch element connector of the latch actuator system.

In addition to one or more of the features described herein the latch actuator member comprises a first toggle member and the removable panel latch actuator member comprises a second toggle member, the first toggle member and the second toggle member selectively operating the latch.

In addition to one or more of the features described herein a first cable operatively connects the latch actuator system and the latch.

In addition to one or more of the features described herein a second cable operatively connects the removable panel latch actuator member and the latch element.

In addition to one or more of the features described herein the latch element is mounted to the interior surface of the removable panel.

In addition to one or more of the features described herein the latch element is rotatable relative to the removable panel.

In addition to one or more of the features described herein the latch element projects outwardly from the interior surface of the removable panel.

In addition to one or more of the features described herein the latch element connector is rotatable relative to the rail member.

In addition to one or more of the features described herein the latch element connector includes a socket for receiving the latch element.

In addition to one or more of the features described herein the rail member includes an upper rail member, a lower rail member spaced from the upper rail member, and an intermediate rail member arranged between and spaced from the upper rail member and the lower rail member, the latch actuator system being mounted on the upper rail member.

A vehicle, in accordance with a non-limiting example, includes a plurality of wheels and a body supported by the plurality of wheels. The body defines a passenger compartment and includes a hybrid door that is selectively reconfigurable by a user. The hybrid door includes a structural door member including a first stile supporting a hinge, a second stile supporting a latch and a rail member extending between the first stile and the second stile. A latch actuator system is mounted to the rail member. The latch actuator system includes a latch actuator member operatively connected to the latch and a latch element connector operatively connected to the latch. A removable panel is connected to at least the first stile and the second stile. The removable panel has an exterior surface and an interior surface covering the latch actuator system. A removable panel handle system is mounted to the removable panel. The removable panel handle system includes a removable panel latch actuator member mounted at the exterior surface and a latch element operatively connected to the removable panel latch actuator member. The latch element is engaged with the latch element connector of the latch actuator system.

In addition to one or more of the features described herein the latch actuator member comprises a first toggle member and the removable panel latch actuator member comprises a second toggle member, the first toggle member and the second toggle member selectively operating the latch.

In addition to one or more of the features described herein a first cable operatively connects the latch actuator system and the latch.

In addition to one or more of the features described herein a second cable operatively connects the removable panel latch actuator member and the latch element.

In addition to one or more of the features described herein the latch element is mounted to the interior surface of the removable panel.

In addition to one or more of the features described herein the latch element is rotatable relative to the removable panel.

In addition to one or more of the features described herein the latch element projects outwardly from the interior surface of the removable panel.

In addition to one or more of the features described herein the latch element connector is rotatable relative to the rail member.

In addition to one or more of the features described herein the latch element connector includes a socket for receiving the latch element.

In addition to one or more of the features described herein the rail member includes an upper rail member, a lower rail member spaced from the upper rail member, and an intermediate rail member arranged between and spaced from the upper rail member and the lower rail member, the latch actuator system being mounted on the upper rail member.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1A:
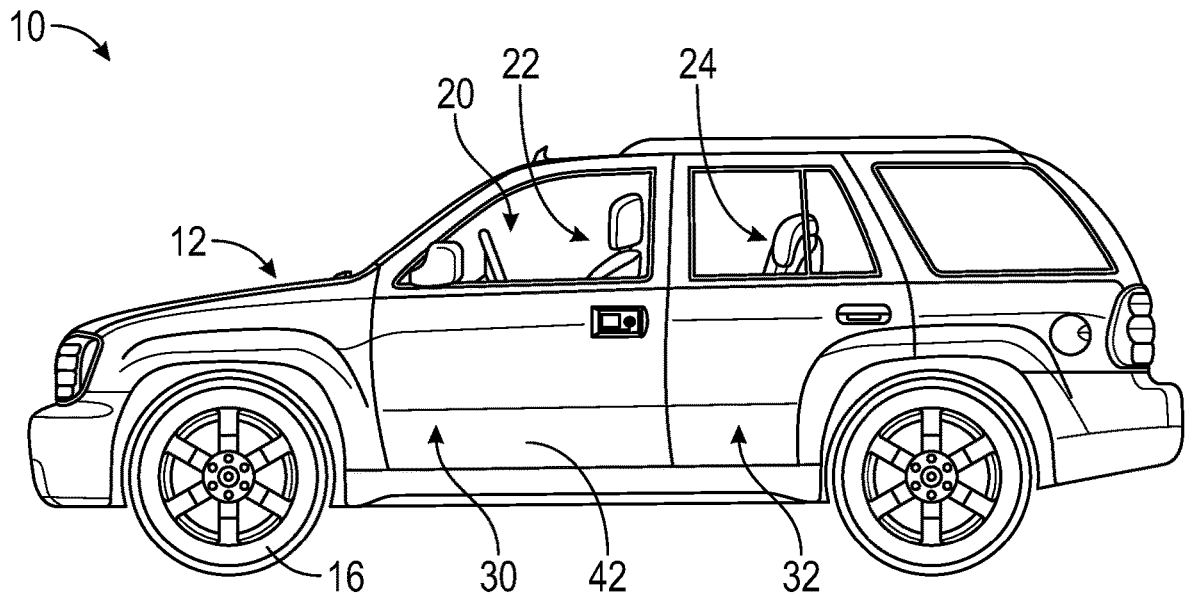
FIG. 1A is a vehicle including a hybrid door having removable panels provided with a release system, in accordance with a non-limiting example.

The following description is merely exemplary in nature and is not intended to limit the present disclosure, its application or uses. It should be understood that throughout the drawings, corresponding reference numerals indicate like or corresponding parts and features.

Figure 1B:
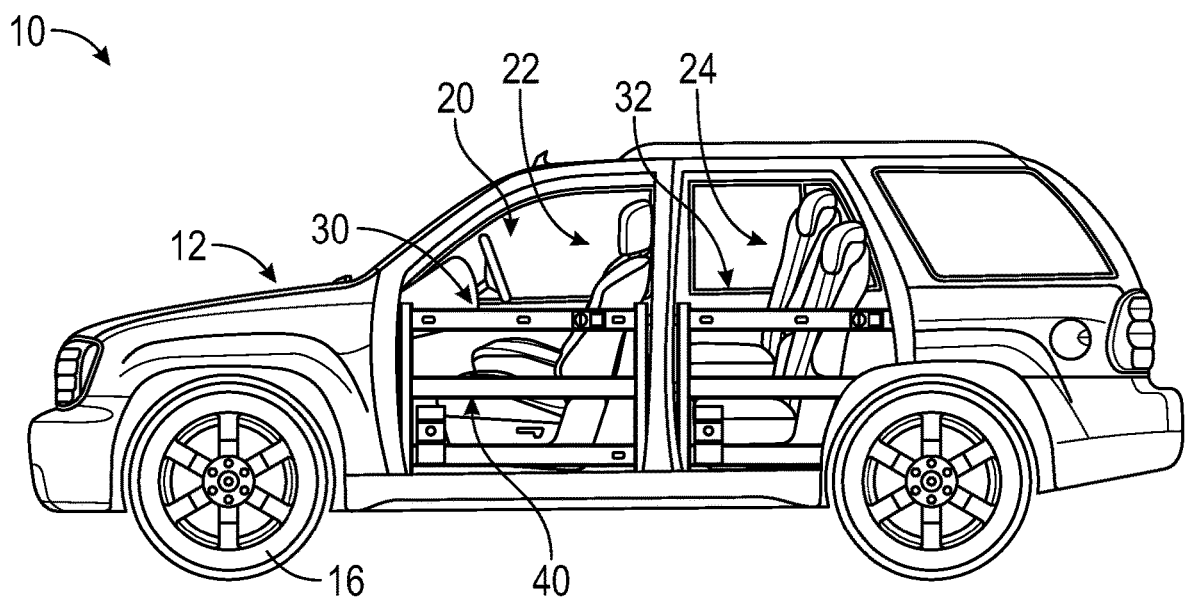
FIG. 1B depicts the vehicle of FIG. 1A with the removable panels removed from the hybrid door, in accordance with a non-limiting example.

A vehicle, in accordance with a non-limiting example, is indicated generally at 10 in FIG. 1A. Vehicle 10 includes a body 12 supported on a frame (not shown) and a plurality of wheels, one of which is indicated at 16. Body 12 includes a passenger compartment 20 that includes a driver's seat 22 and a least one rear passenger seat 24. Vehicle 10 includes a first hybrid door 30 that provides access to driver's seat 22 and a second hybrid door 32 that provides access to rear passenger seat 24. Additional hybrid doors (not shown) may be provided on an opposite side (also not shown) of vehicle 10. At this point, it should be understood that the term "hybrid door" describes a door that can be configured with exterior and interior panels as shown in FIG. 1A and without the exterior and interior panels as shown in FIG. 1B creating a more open appearance.

Figure 2:
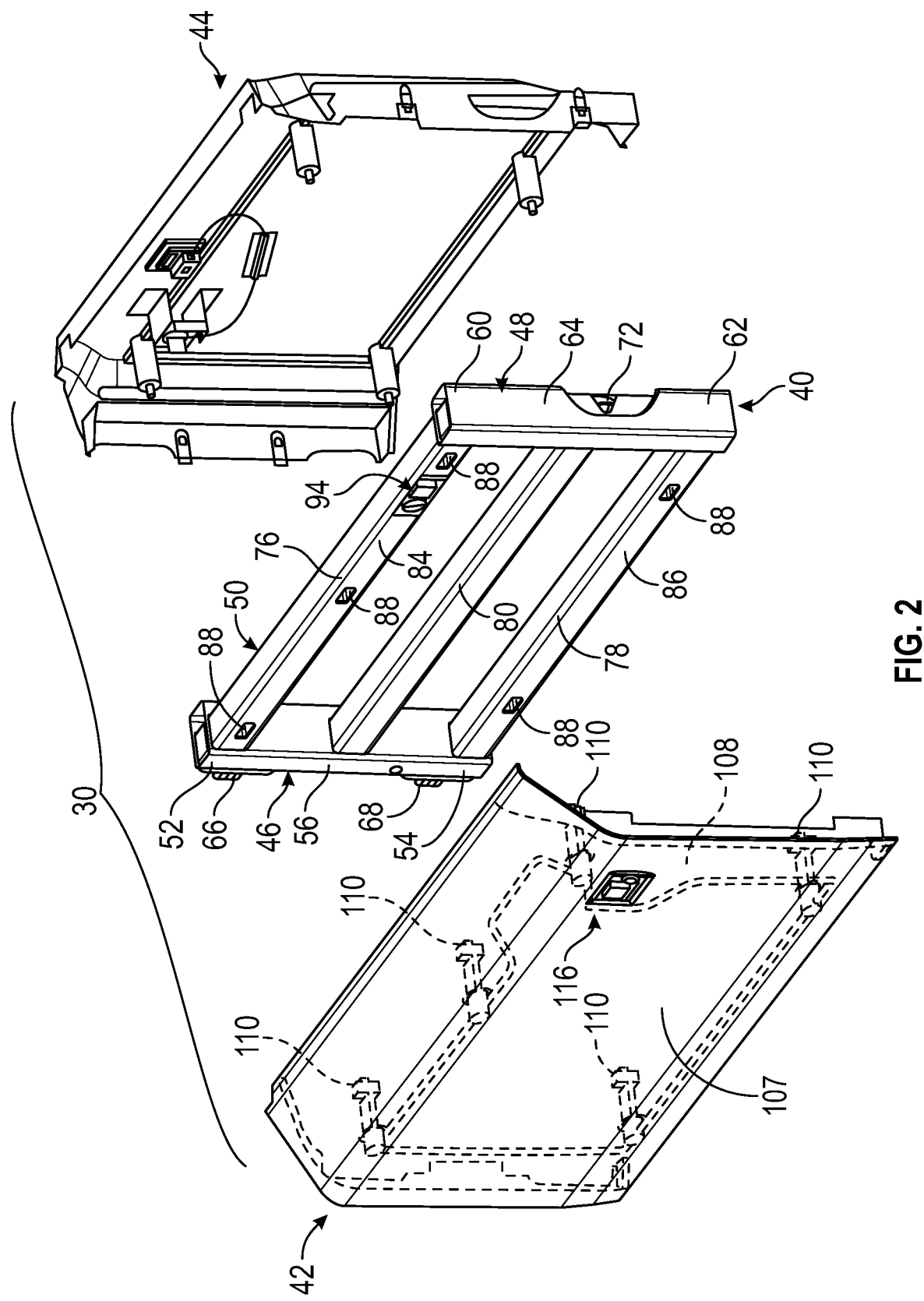
FIG. 2 is a disassembled partial glass view of the hybrid door of FIG. 1A.

Reference will now follow to FIG. 2 in describing hybrid door 30 with an understanding that hybrid door 32 includes corresponding structure. Hybrid door 30 includes a structural door member 40 that is covered by a first or outer removable panel 42 and a second or inner removable panel 44. Structural door member 40 includes a first stile 46 connected to a second stile 48 by a plurality of rail members, one of which is indicated at 50. First stile 46 includes a first end 52, a second end 54, and an intermediate portion 56. Second stile 48 includes a first end section 60, a second end section 62. and an intermediate section 64. First stile 46 supports a first hinge 66 arranged near first end 52 and a second hinge 68 arranged near second end 54. Second stile 48 includes a latch 72 arranged along intermediate section 64. Latch 72 engages with body 12 to secure hybrid door 30 in a closed position.

Plurality of rail member 50 include an upper rail member 76 that extends between and connects with first end 52 and first end section 60, a lower rail 78 that extends between and connects with second end 54 and second end section 62, and an intermediate rail member 80 that is spaced from upper rail member 76 and lower rail member 78 and connects with intermediate portion 56 and intermediate section 64. Upper rail member 76 includes an outer surface 84 and lower rail member 78 includes an outer surface section 86. Outer surface 84 and outer surface section 86 include a plurality of coupler elements 88 which, as will be detailed herein, serve as a connecting arrangement for first removable panel 42. Second removable panel 44 is mounted in a similar fashion to an opposing side of structural door member 40.

Figure 3:
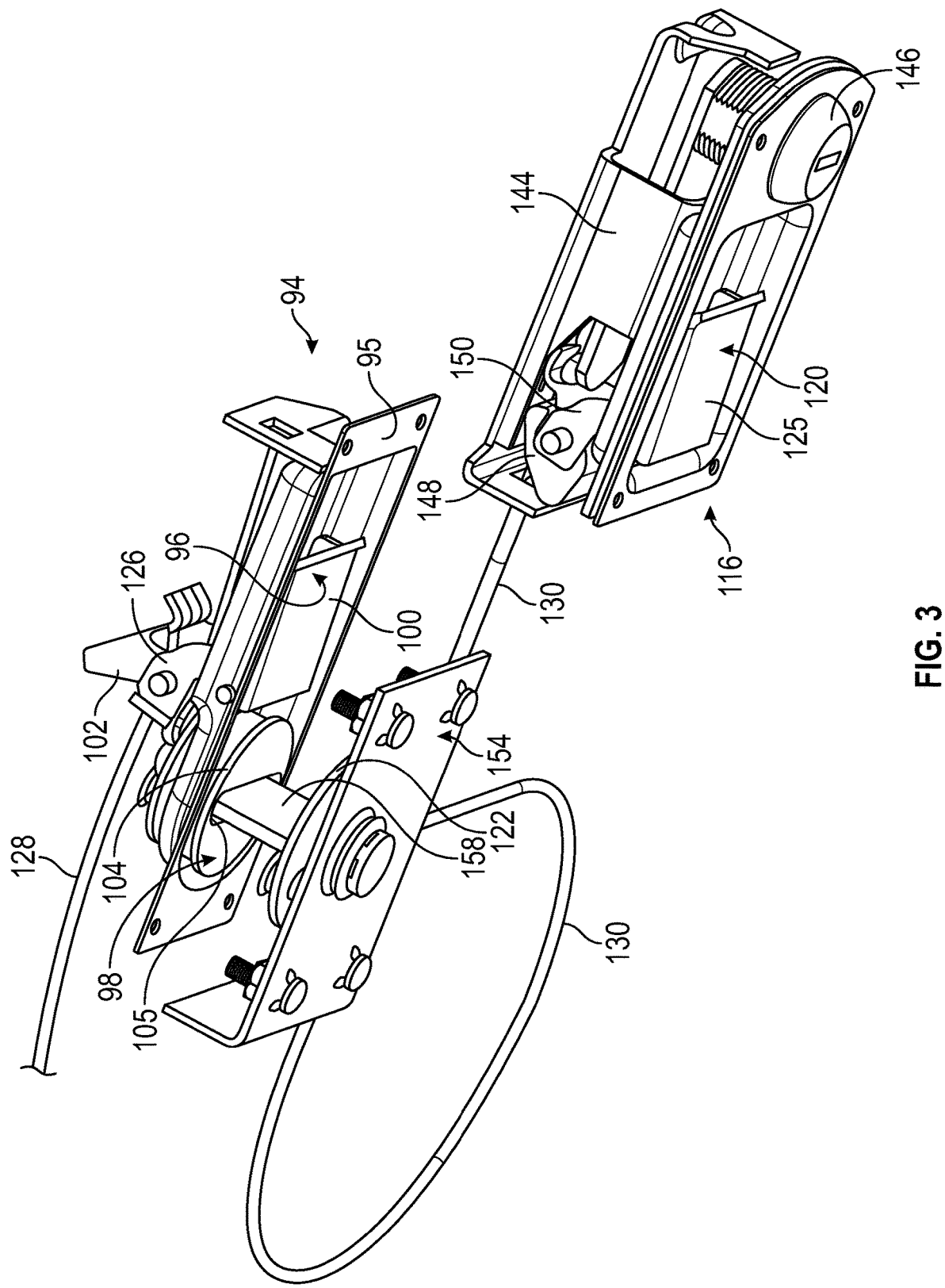
FIG. 3 is a perspective view of the release system associated with the hybrid door of FIG. 2, in accordance with a non-limiting example.
Figure 4:
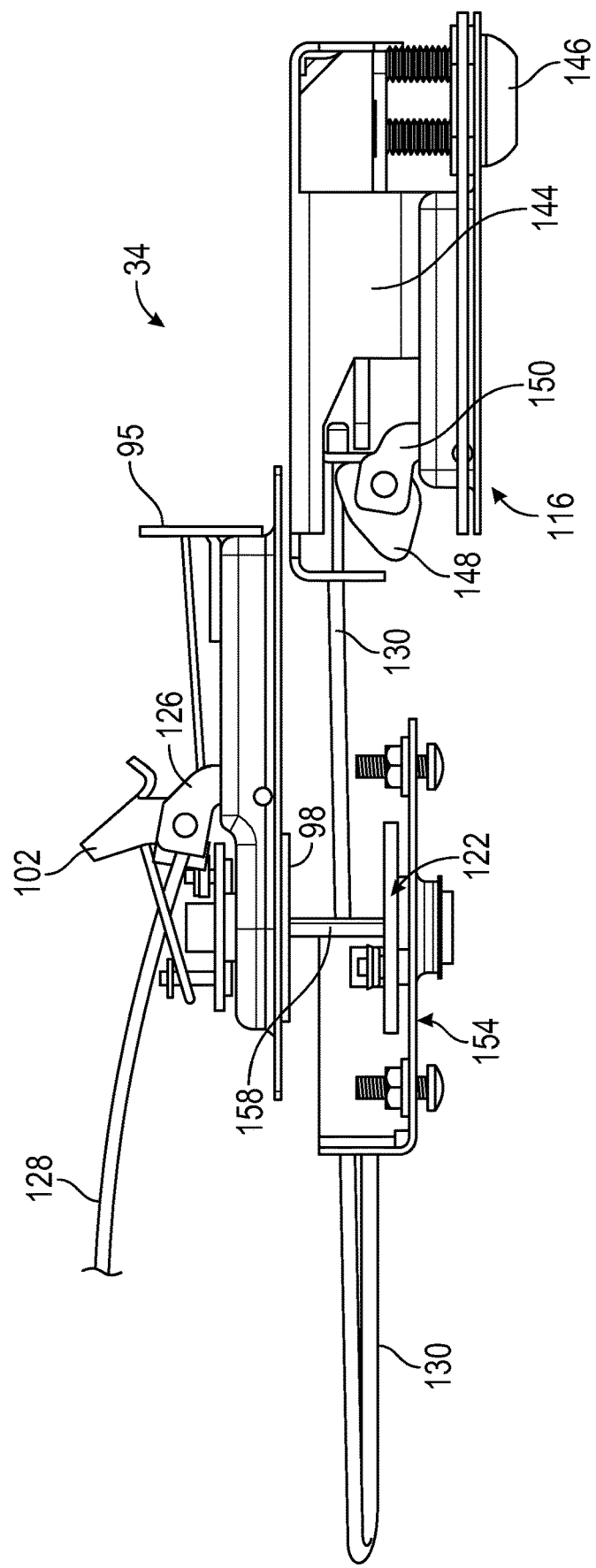
FIG. 4 is a top view of the release system of FIG. 3, in accordance with a non-limiting example.

In a non-limiting example, structural door member 40 includes a latch actuator system 94 mounted to upper rail member 76. Latch actuator system 94 may be manipulated to unlatch hybrid door 30. Referring to FIGS. 3 and 4, latch actuator system 94 includes a bracket 95 that is mounted in upper rail 76. Bracket 95 supports a latch actuator member 96 and a latch element connector 98. Latch actuator member 96 takes the form of a first toggle 100 that may be manipulated to operate a latch release 102 that disengages latch 72. Latch element connector 98 is shown in the form of a rotatable cam 104 having a socket 105.

First removable panel 42 includes an exterior surface 107 and an interior surface 108. Interior surface 108 supports a plurality of connector members 110 that selectively engage with coupler elements 88 to secure first removable panel 42 to structural door member 40. In a non-limiting example, first removable panel 42 supports a removable panel latch actuator system 116. As will be detailed herein, removable panel latch actuator system 116 connects with latch actuator system 94 on structural door member 40 and may be used to operate latch 72 when latch actuator system 34 is covered.

In a non-limiting example shown in FIGS. 3 and 4, removable panel latch actuator system 116 includes a removable panel latch actuator member 120 and a latch element 122. Removable panel latch actuator member 120 takes the form of a second toggle 125 that may be manipulated to operate latch release 102 to disengage latch 72. Latch element 122 cooperates with latch element connector 98 to transfer mechanical energy created when manipulating second toggle 125 to latch actuator system 94. In order to transfer mechanical energy between components, a connector 126 supports latch release 102 and is connected with latch actuator member 96. A first cable 128 extends from connector 126 to latch 72. A second cable 130 extends from removable panel latch actuator member 120 to latch element 122.

In a non-limiting example, removable panel latch actuator system 116 includes a housing 144 that is mounted in first removable panel 42 and supports removable panel latch actuator member 120 and a lock 146. Removable panel latch actuator member 120 is operatively connected to a latch release element 148 through a connector element 150. Latch release element 148 is connected to latch element 122 through second cable 130. Latch element 122 is rotatably supported by a latch element support 154 that is mounted to interior surface 108 of first removable panel 42. Latch element 122 takes the form of a blade or projection 158 that extends outwardly from interior surface 108 and is received by socket 105.

The dual latch mechanism described herein provides a first latch actuator member that may be accessed to unlatch the vehicle door when exterior panels are removed and a second latch actuator member that is supported on one or both of the removable panels. The second latch actuator plugs into the first latch actuator in order to provide a simple and seamless transition between a more open door structure and a more closed door structure. The more open door structure creates an open passenger compartment environment while, and the same time. provides a sense of security offered by a door.

Further, while shown as being provided on the exterior removable panel, similar latch release structure can be provided on the interior removable panel that connects with additional stationary latch elements on inner surfaces of the structural door member. Further, the dual latch mechanism may be employed in connection with non-functional panels such as interior trim (beauty panels), as well as various functional panels such as glove box panels, console panels, and the like.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A hybrid vehicle door comprising:
    a structural door member including a first stile supporting a hinge, a second stile supporting a latch and a rail member extending between the first stile and the second stile;
    a latch actuator system mounted to the rail member, the latch actuator system including a latch actuator member operatively connected to the latch and a latch element connector operatively connected to the latch;
    a removable panel connected to at least the first stile and the second stile, the removable panel having an exterior surface and an interior surface covering the latch actuator system; and
    a removable panel handle system mounted to the removable panel, the removable panel handle system including a removable panel latch actuator member mounted at the exterior surface and a latch element operatively connected to the removable panel latch actuator member, the latch element being engaged with the latch element connector of the latch actuator system.

2. The hybrid vehicle door according to claim 1, wherein the latch actuator member comprises a first toggle member and the removable panel latch actuator member comprises a second toggle member, the first toggle member and the second toggle member selectively operating the latch.

3. The hybrid vehicle door according to claim 1, further comprising a first cable operatively connecting the latch actuator system and the latch.

4. The hybrid vehicle door according to claim 3, further comprising a second cable operatively connecting the removable panel latch actuator member and the latch element.

5. The hybrid vehicle door according to claim 1, wherein the latch element is mounted to the interior surface of the removable panel.

6. The hybrid vehicle door according to claim 5, wherein the latch element is rotatable relative to the removable panel.

7. The hybrid vehicle door according to claim 6, wherein the latch element projects outwardly from the interior surface of the removable panel.

8. The hybrid vehicle door according to claim 7, wherein the latch element connector is rotatable relative to the rail member.

9. The hybrid vehicle door according to claim 8, wherein the latch element connector includes a socket for receiving the latch element.

10. The hybrid vehicle door according to claim 1, wherein the rail member includes an upper rail member, a lower rail member spaced from the upper rail member, and an intermediate rail member arranged between and spaced from the upper rail member and the lower rail member, the latch actuator system being mounted on the upper rail member.

11. A vehicle comprising:
    a plurality of wheels;
    a body supported by the plurality of wheels, the body defining a passenger compartment and including a hybrid door that is selectively reconfigurable by a user, the hybrid door comprising:
        a structural door member including a first stile supporting a hinge, a second stile supporting a latch and a rail member extending between the first stile and the second stile;
        a latch actuator system mounted to the rail member, the latch actuator system including a latch actuator member operatively connected to the latch and a latch element connector operatively connected to the latch;
        a removable panel connected to at least the first stile and the second stile, the removable panel having an exterior surface and an interior surface covering the latch actuator system; and
        a removable panel handle system mounted to the removable panel, the removable panel handle system including a removable panel latch actuator member mounted at the exterior surface and a latch element operatively connected to the removable panel latch actuator member, the latch element being engaged with the latch element connector of the latch actuator system.

12. The vehicle according to claim 11, wherein the latch actuator member comprises a first toggle member and the removable panel latch actuator member comprises a second toggle member, the first toggle member and the second toggle member selectively operating the latch.

13. The vehicle according to claim 11, further comprising a first cable operatively connecting the latch actuator system and the latch.

14. The vehicle according to claim 13, further comprising a second cable operatively connecting the removable panel latch actuator member and the latch element.

15. The vehicle according to claim 11, wherein the latch element is mounted to the interior surface of the removable panel.

16. The vehicle according to claim 15, wherein the latch element is rotatable relative to the removable panel.

17. The vehicle according to claim 16, wherein the latch element projects outwardly from the interior surface of the removable panel.

18. The vehicle according to claim 17, wherein the latch element connector is rotatable relative to the rail member.

19. The vehicle according to claim 18, wherein the latch element connector includes a socket for receiving the latch element.

20. The vehicle according to claim 1, wherein the rail member includes an upper rail member, a lower rail member spaced from the upper rail member, and an intermediate rail member arranged between and spaced from the upper rail member and the lower rail member, the latch actuator system being mounted on the upper rail member.

* * * * *